United States Patent
Weckesser et al.

(10) Patent No.: US 9,870,212 B2
(45) Date of Patent: Jan. 16, 2018

(54) DATA LOADING DEVICE AND DATA LOADING METHOD FOR LOADING SOFTWARE INTO AIRCRAFT SYSTEMS

(71) Applicant: LUFTHANSA TECHNIK AG, Hamburg (DE)

(72) Inventors: Christian Weckesser, Idstein (DE); Marc-Christian Reichle, Heddesheim (DE); Jörg Schowalter, Alsheim (DE); Matthias Fliegner, Frankfurt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 261 days.

(21) Appl. No.: 14/781,818

(22) PCT Filed: Dec. 3, 2013

(86) PCT No.: PCT/EP2013/075355
§ 371 (c)(1),
(2) Date: Oct. 1, 2015

(87) PCT Pub. No.: WO2014/095341
PCT Pub. Date: Jun. 26, 2014

(65) Prior Publication Data
US 2016/0110179 A1    Apr. 21, 2016

(30) Foreign Application Priority Data
Dec. 20, 2012 (DE) .......................... 10 2012 223 933

(51) Int. Cl.
G06F 15/16    (2006.01)
G06F 9/445    (2006.01)
G06F 13/40    (2006.01)

(52) U.S. Cl.
CPC .................. *G06F 8/61* (2013.01); *G06F 8/65* (2013.01); *G06F 13/4022* (2013.01)

(58) Field of Classification Search
None
See application file for complete search history.

(56) References Cited

U.S. PATENT DOCUMENTS 8,341,298 B2 * 12/2012 Wilber .................... H04L 67/12
370/241
2009/0112884 A1    4/2009 Sathath et al.
2012/0303882 A1    11/2012 Hershler

OTHER PUBLICATIONS

IOGEAR, An Aten International Company, "Quick Start Guide: 4×2 / 4×4 USB 2.0 Peripheral Sharing Switch," GUS402/GUS404, Part No. Q1221-b, Jan. 1, 2012, pp. 1-6, XP055100370, Foothill Ranch, CA 92610, USA, retrieved from the Internet: URL: http://www.iogear.com/support/manual/GUS402_GUS404_QSG.pdf [retrieved on Feb. 5, 2014].

(Continued)

*Primary Examiner* — Cheng-Yuan Tseng
(74) *Attorney, Agent, or Firm* — Saliwanchik, Lloyd & Eisenschenk

(57) ABSTRACT

An embodiment relates to a data loading device and a corresponding data loading method for loading software into aircraft systems, the data loading device incorporating a portable computer and a data storage device. The data loading device incorporating a switching device, the switching device having an external data connection. The switching device can switch connections between the computer, the data storage device and the data connection, the switching device having a first switching state which includes a connection between the computer and the data storage device. Furthermore, the switching device has a second switching state which includes a connection between the data storage device and the data connection.

20 Claims, 2 Drawing Sheets

(56) References Cited

OTHER PUBLICATIONS

First Examination Report dated Sep. 11, 2013, for German Patent Application No. 10-2012-223933.2.
International Preliminary Report on Patentability, dated Jun. 23, 2015, for International Application No. PCT/EP2013/075355.

* cited by examiner

DATA LOADING DEVICE AND DATA LOADING METHOD FOR LOADING SOFTWARE INTO AIRCRAFT SYSTEMS

CROSS REFERENCE TO RELATED APPLICATIONS

This application is a National Stage Application of International Application Number PCT/EP2013/075355, filed Dec. 3, 2013; which claims priority to German Patent Application No. 10 2012 223 933.2, filed Dec. 20, 2012; both of which are incorporated herein by reference in their entirety.

The invention relates to a data loading device for loading software into aircraft systems, the data loading device comprising a portable computer and a data storage device as well as a corresponding data loading method.

Many electronic components that execute a program or operating system stored in the electronic component in order to fulfill their respective functions are installed in a modern aircraft. These electronic components may be flight control systems, radio and radar systems, for example. Furthermore, aircraft are installed with electronic components which, in order to fulfill their function in the aircraft, have to access a large amount of data in addition to a program, for example navigation systems which regularly have to be updated with the latest information regarding changes to radio beacons, airports, etc.

The majority of the electronic components therefore undergo at least one software update and/or data update during the service life thereof. Components which access software that uses information from databases are updated significantly more frequently.

Since, for updating the electronic components, it is not expedient for said components to be individually removed from the aircraft and for the appropriate changes or updates to be made in a workshop, these components can generally be provided with updated or improved programs and/or updated database information when they are still installed. The electronic components of an aircraft are generally connected to a data bus, which can be used for loading the changes, so that the electronic components need to be accessed from outside only at one point or a few points on the aircraft.

The updates or changes to software or data for electronic components of an aircraft are made available to the operator of the aircraft or of a fleet of aircraft by the aircraft manufacturer, the manufacturers of the individual electronic components or others as software packets or data packets. They are compiled in each case for a certain aircraft as a data configuration. These are also referred to as field loadable software (FLS).

The data configurations to be loaded into an aircraft are extremely security-critical because of their relevance to flight safety, as a result of which a release of the data configurations, verification management and particular care in version maintenance are required. Furthermore, due to official regulations, when on the ground the operator always has to be able to check and verify the current data configurations of an aircraft that is in operation.

When changing or updating the data configuration of the aircraft in question, it is necessary to produce data media, which is very time-consuming. In addition, it is also very time-consuming to manage, distribute and monitor said media, since owing to the relevance of safety in flight operation, special verification management is required.

The data configuration is prepared after a job order is produced for the transfer to the aircraft. Data media are used for the transfer and are loaded with the applicable data configuration for this order. In current aircraft types, these are generally USB media, which have replaced floppy disks or CDs as data media. These USB media are used as data media for the data of the field loadable software and have to be produced and stored until they are taken to the aircraft.

In a loading process on the aircraft, the USB media are connected to a corresponding interface of a data loader of the aircraft, which interface reads out the USB medium and loads the applicable data configuration into the individual system components of the aircraft. The software updates can thus be transferred to the individual electronic components of the aircraft as a new data configuration of the aircraft.

When updating software in aircraft systems, for security reasons it has to be ensured that the data on the data medium or the USB medium are not read out or altered by a third party. For this purpose, after completion of the data loading process, it also has to be ensured that the data on the data medium are erased again in order to rule out data misuse.

In order to fulfil these requirements, the USB media are first manually produced, i.e. the applicable field loadable software or data configuration is stored on a corresponding USB data medium and is then sealed in a sealed transport container. The transport container is then taken to a storage facility and is stored there until it is taken to the particular aircraft. If the aircraft in question is being prepared for maintenance, the data medium is transported from the storage facility to this location. An appropriate engineer inspects the sealed transport container, removes the USB data medium and uses this on the aircraft.

The USB data medium that has been used is then re-packaged in a sealed transport container that is generally transported to the place of production, where the data medium is read out, provided that the aircraft has stored data on the USB data medium. The data medium is lastly destroyed, or the data are erased from the data medium.

Updating data configurations using the applicable data media and the necessary security precautions is accordingly time-consuming and therefore expensive. In addition, the method results in long production times and lead times, which lengthen the response times to short-notice software updates. This is problematic in particular if the updates are what is known as an Emergency AD, which provides a software update to aircraft systems before the next take-off, and, depending on the ground time of the aircraft, this may lead to temporary grounding of the aircraft until the update, and as a result this can be very expensive.

Furthermore, using the current method having sealed transport containers, only modification of the data can be ruled out. This cannot therefore rule out third parties stealing a transport container and reading out the data.

Directly transferring data from a PC or computer to the aircraft systems via a PC or computer connection is subject to heavy restrictions in order to prevent the active computer, which provides the data, from defective interaction with the aircraft systems in any event. Therefore, when a computer being an active electronic apparatus is connected for example to the USB connection of an aircraft that is set up for passive USB storage media, very complex documentary evidence of security has to be produced.

The problem addressed by the invention is to provide a device and a corresponding method which make it possible to efficiently and safely load data configurations into aircraft with reduced complexity.

The problem addressed by the invention is solved, proceeding from the preamble of claim 1, by the characterising features thereof. A data loading device for loading software into aircraft systems is proposed, the data loading device comprising a portable computer and a data storage device. According to the invention, the data loading device comprises a switching device, the switching device comprising an external data connection. The switching device can switch connections between the computer, the data storage device and the data connection, the switching device having a first switching state which comprises a connection between the computer and the data storage device, and the switching device having a second switching state which comprises a connection between the data storage device and the data connection.

The switching device allows an appropriate data medium to be produced at short notice in the form of the data storage device in the first switching state having the applicable data for the data configuration, which can be stored on the computer. The applicable data can be copied into the data storage device on the aircraft, for example, so that the data medium no longer needs to be packaged, sealed and unpacked. It is ensured that the data are secured against access by third parties by monitoring by the appropriate maintenance engineer and by compiling the data on the data storage device a short amount of time in advance, so that there is only a short interval, which is monitored by the engineer, between compiling the unencrypted data on the data storage device and using said data on the aircraft.

The data storage device is therefore advantageously physically connected to the computer, so that the storage device and the computer cannot be readily disconnected from each other, thus providing advantages in terms of security.

The data storage device can then be connected to the aircraft, in particular to the data loader of the aircraft, via the data connection by means of the switching device in the second switching state. In this switching state of the switching device, the data storage device fulfils the same function as the data media from the prior art. A difference lies in the switching device, which in this case is arranged in the data connection between the data storage device and the aircraft.

As a result, the data loading device constitutes the secure, non-manipulable electronic provision of data, preferably via a USB interface.

Preferably, the switching device does not have a switching state which comprises a direct connection between the computer and the data connection.

This is advantageous for preventing the computer from being connected to the aircraft in any case, so that no negative interaction can take place. Therefore, a complex aviation-authority approval procedure for the computer can be avoided, since it cannot be connected to the aircraft because of the switching device. This makes it possible to use a commercially available computer, and this leads to considerable advantages in terms of cost.

In an advantageous embodiment, the switching device comprises an electronically controlled switch. An electronically controlled switch allows for a compact design, it being possible, in a preferred embodiment, for the switch to be controlled by the computer, for example, and therefore operation is simplified.

If a power supply to the computer and/or to the switching device is interrupted, the switching device is advantageously configured to automatically switch into the first switching state.

In this way, it is ensured that after the power supply is interrupted or after the switching device is switched on, the data storage device cannot simply be read out externally, which is beneficial for data security.

In addition to the first and the second switching state, the switching device may have a third switching state, which in a possible advantageous embodiment can be adopted after power is interrupted, for example instead of the first switching state, the switching device disconnecting any connection between the data storage device, the computer and the data connection.

Preferably, the data storage device comprises a Universal Serial Bus (USB) standard interface. The data storage device may thus be a USB mass storage device that can be read out in accordance with the USB standard, for example a USB stick. In this way, the data storage device can be read out in a simple manner by standard data loaders of an aircraft, as a result of which the data storage device can be used in a simple manner to load field loadable software.

Preferably, the switching device is arranged on an interface card. This allows for a small structure and simple integration into a computer. The interface card can communicate with a computer by means of a PCI or PCIe bus, for example. Furthermore, in preferred embodiments the interface card is a PCMCIA card or an ExpressCard, which can preferably use an internal USB interface of a computer.

Furthermore, the computer, data storage device and switching device are preferably arranged together in one housing. This allows mechanical protection against access to the individual parts and simplifies handling of the data loading device. In an alternative advantageous embodiment, the switching device can be connected to the computer by means of an external interface. The switching device can be connected to the computer in a simple manner by means of a USB connection, for example. The computer therefore does not require any particular equipment and can be used as a data loading device in a cost-effective manner.

Furthermore, the problem addressed by the invention is solved, proceeding from the preamble of embodiment 9 in the Embodiments section, by the characterising features thereof. A data loading method comprising a data loading device according to any of claims embodiments 1 to 8 in the Embodiments section is proposed, which according to the invention comprises the following method steps:
 providing the software on the computer,
 copying the software from the computer into the data storage device, the switching device being in the first switching state,
 switching the switching device into the second switching state,
 connecting the data connection to an aircraft system.

By providing the software on the computer, said computer contains all the data which are intended to be provided to the aircraft, e.g. as a USB data medium, on an internal drive of the computer. The data on the internal drive of the computer may be transmitted and updated for example via a network connection, via the 3G standard, WiFi and/or LAN, for example. This may be independent of the use of USB storage media.

In a preferred embodiment, the following method steps are carried out after the data connection is connected to an aircraft system:
 disconnecting the data connection from the aircraft system,
 switching the switching device into the first switching state,
 reading out the data storage device using the computer, erasing the software from the data storage device.

As a result, data which the data loader of the aircraft has written back onto the data storage device can be transferred to the computer, which can further process and/or communicate the applicable data for verification management. Furthermore, the data storage device can be erased straight after use, so that undesired access of these data on the data storage device by third parties can be prevented. At the same time, the switching device also ensures that the computer does not establish a direct data connection to the aircraft systems at any time.

Preferably, the software is provided on the computer in an encrypted manner. By encrypting the software on the computer, these data can be effectively protected against access and manipulation by third parties without the use of seals. The maintenance engineer can decrypt the data shortly before the process of copying the applicable data configuration into the data storage device, and can then re-encrypt said data. In an advantageous embodiment, this can take place in a manner that is transparent to the user. The applicable safety measures for unencrypted data media using sealed transport containers are thus obsolete.

The invention is explained in the following on the basis of preferred embodiments with reference to the accompanying drawings, in which.

Figure 1:
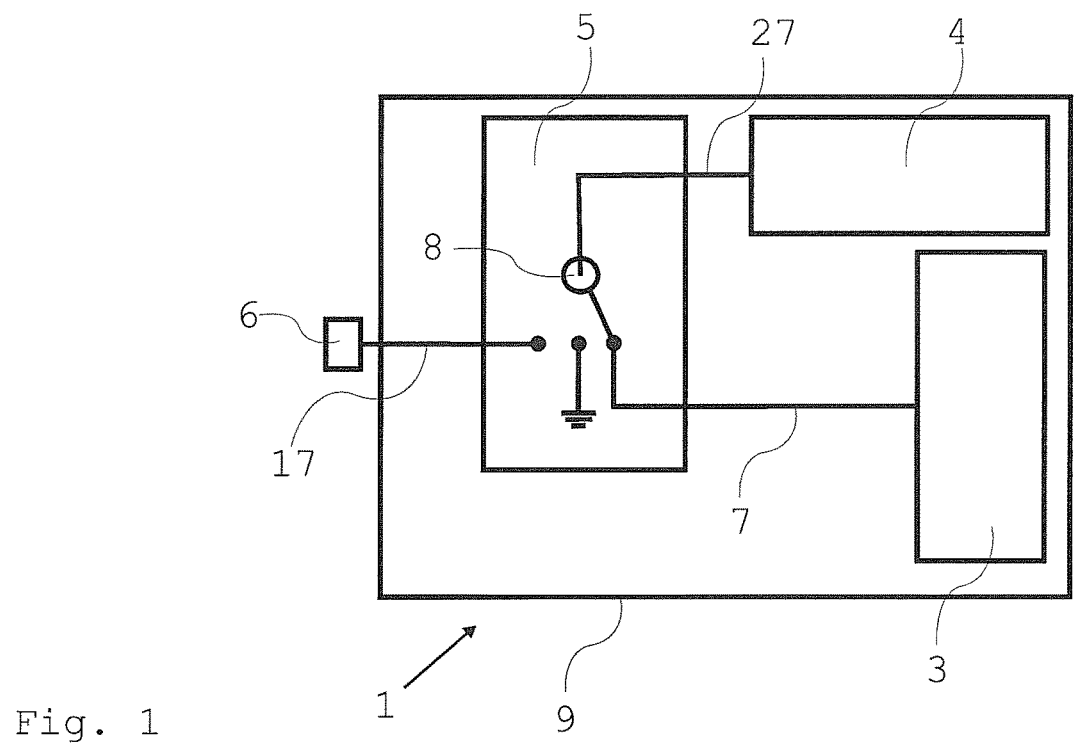
FIG. 1 shows a data loading device in a first switching state.

FIG. 1 schematically shows an embodiment of a data loading device 1 which comprises a portable computer 3 and a data storage device 4. Furthermore, the data loading device 1 comprises a data connection 6 which is intended to be connected to an aircraft, in particular to a data loader that is integrated in the aircraft. A switching device 5 is provided in the data loading device 1 between the computer 3, the data storage device 4 and the data connection 6, which device comprises a connection 7, 17, 27 to the computer 3, the data connection 6 and the data storage device 4 respectively. Here, the data storage device 4 is not part of the computer 3, but can be integrated into or installed on the computer 3.

Here, the connections 7, 17, 27 are advantageously data connections that allow data transmission in accordance with a USB standard. In alternative embodiments, another data transmission standard may also be used.

The switching device 5 preferably switches the connections 7, 17, 27 between two switching states. In a first switching state, which is shown in FIG. 1, a connection 7, 27 is established between the data storage device 4 and the computer 3 by means of the switching device 5. In this switching state, the data storage device 4 may be recognised by the computer 3 as an external USB mass storage device, for example, and may be used accordingly.

In a typical use of the data loading device 1, a maintenance engineer, for example, uses the data loading device 1 on the aircraft to load a new data configuration. The applicable data are stored on the computer 3 in an encrypted manner. The maintenance engineer decrypts the data using a corresponding password, for example, and starts a process of copying the data or the software to the data storage device 4 using the computer 3. Here, it is irrelevant whether the aircraft or the data loader of the aircraft is already connected to the data connection 6 of the data loading device 1, since this connection does not comprise a connection 17 to the data storage device 4 or the computer 3 in the first switching state. In the first switching state, there is an exclusive connection 7, 27 between the data storage device 4 and the computer 3 which excludes the data connection 6.

After copying, the data are available on the data storage device as field loadable software in an unencrypted manner, and can be used.

Figure 2:
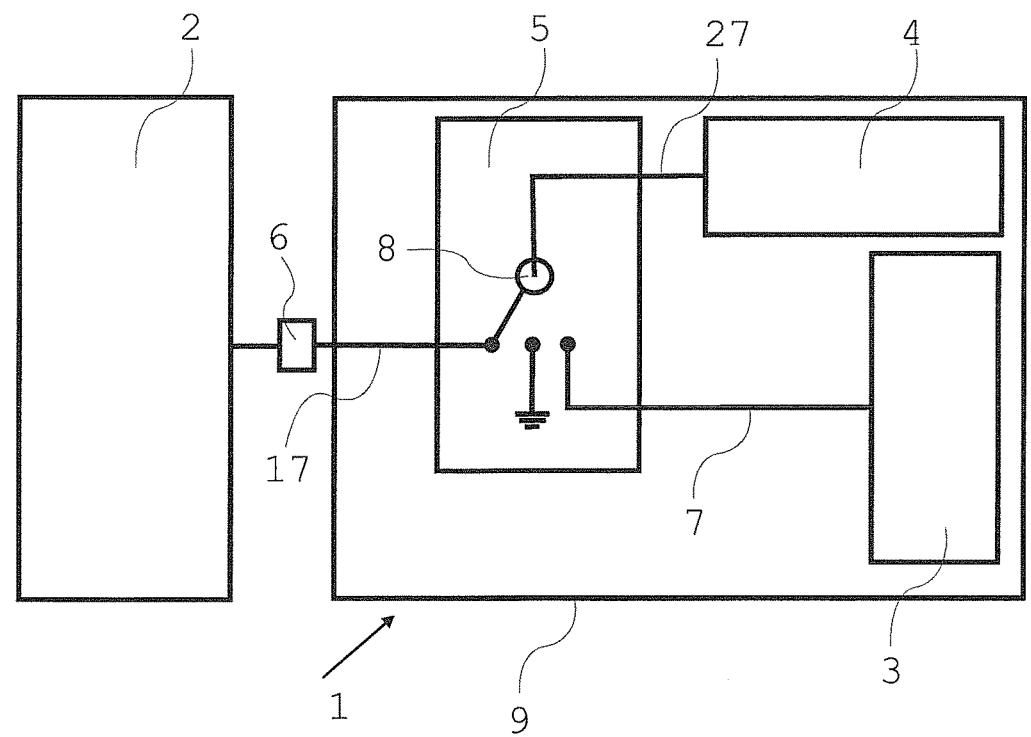
FIG. 2 shows a data loading device in a second switching state having aircraft systems connected thereto.

FIG. 2 shows, in the next working step, how the data loading device 1 having the data connection 6 is connected to an aircraft system 2, such as a USB connection of the aircraft, a data loader of the aircraft or a comparable electronic system of the aircraft. The connection 17 between the switching device 5 and the aircraft system 2 is made by means of the USB standard in preferred embodiments.

FIG. 2 shows the switching device 5 in a second switching state, which comprises a connection 17, 27 between the data storage device 4 and the aircraft system 2. This connection 17, 27 is exclusive, so that there is no connection 7, 17 between the aircraft system 2 and the computer 3 in the second switching state either. Additional switching states may be provided in the switching device 5, which disconnect each connection 7, 17, 27 between all the connected components, for example. This possible switching state is schematically shown in FIG. 1 and FIG. 2 by the central connection for the schematically shown switch 8 of the switching device 5. In advantageous embodiments, the switching device comprises an electronically controlled switch 8, which can be controlled by the computer 3 or by an appropriate control panel, for example. The switching process of the electronically controlled switch 8 can be triggered by the maintenance engineer, for example, after copying the software into the data storage device 4 has been completed.

In this embodiment, the data storage device 4 has been connected to an aircraft system 2 by the second switching state being adopted. In an advantageous embodiment, the aircraft system 2 automatically recognises the connection of the data storage device 4. Alternatively, a corresponding manual control input can be made on the aircraft system 2.

The aircraft system 2 reads out the applicable data configuration or field loadable software from the data storage device 4 and processes and/or transmits this to other systems or components of the aircraft, so that the aircraft is equipped with a new software version or a new data configuration.

After the updating process is complete, the data connection 6 and the aircraft system 2 are manually disconnected again. At this point, the data are still on the USB stick and are unencrypted. Therefore, the data would not be protected against undesired access by third parties if the data loading device 1 were stolen. Furthermore, there would be risk during further use of the data loading device that, if it were connected to an aircraft system of another aircraft, data would be read into said system that are not intended for that aircraft. In an advantageous embodiment, the data loading device 1 switches back into the first switching state when the connection 7 is interrupted and erases the data on the data storage device 4. Therefore, the data is prevented from being misused or from being accidentally used on another aircraft system 2.

In an advantageous embodiment, the switching state of the switching device 5 is shifted back into the first switching state, so that the computer 3 can read out the data on the data storage device 4. This may for example be useful or even necessary if the aircraft systems 2 have written feedback on the data loading process onto the data storage device 4. In this case, it is not entirely necessary for the data loading process to read out the data, and this can also be omitted. Furthermore, the data can be read out by the computer 3 at least in parts as soon as the first switching state has been adopted and the computer 3 automatically recognises the connection of the data storage device 4.

After being read out, the data on the data storage device 4 are erased again, so that they can no longer be read out by unauthorised persons or be incorrectly loaded into another aircraft.

Figure 3:
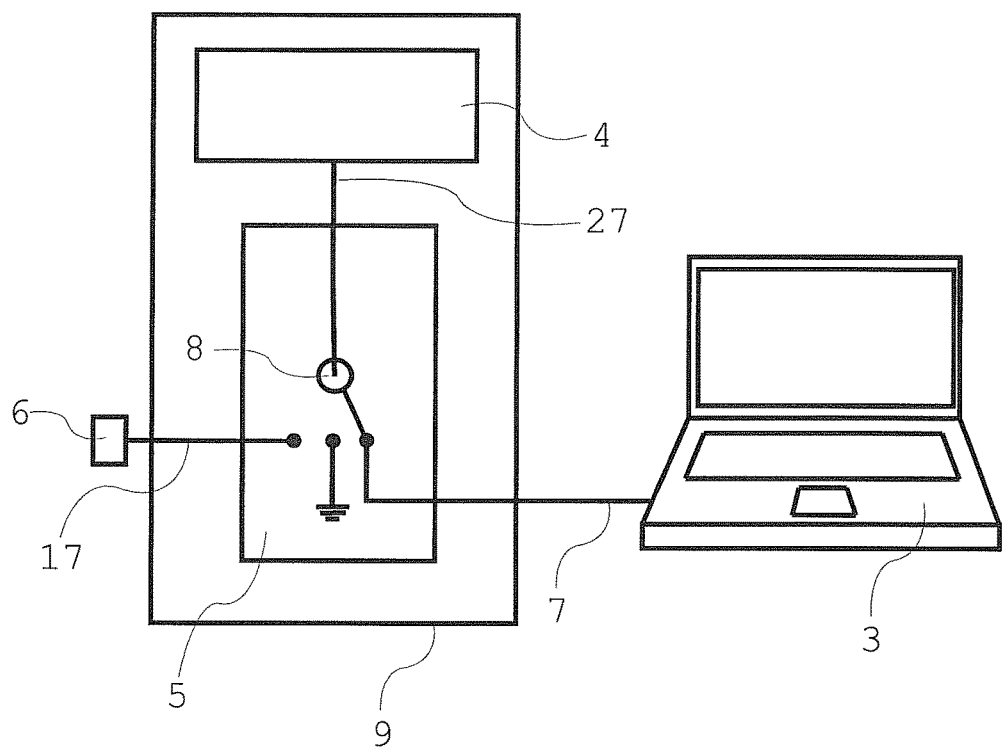
FIG. 3 shows a data loading device comprising an external interface with the computer.

FIG. 3 shows a possible embodiment in which the data loading device 1 comprises an external interface with the computer 3. The switching device 5 is externally connected to the computer 3, e.g. to a USB connection, by means of a connection 7. Furthermore, the data storage device 4 is also externally connected to the switching device 5 by means of a connection 27. The data loading device 1 can therefore be used with many computers 3, since the connection of the switching device 5 can be connected to another computer in a simple manner.

In a possible alternative embodiment, the switching device 5 and the data storage device 4 are arranged in a shared housing 9 without the computer 3. This reduces the number of parts compared with an externally connected data storage device 4 and improves the handling and security of the data loading device 1.

Figure 4:
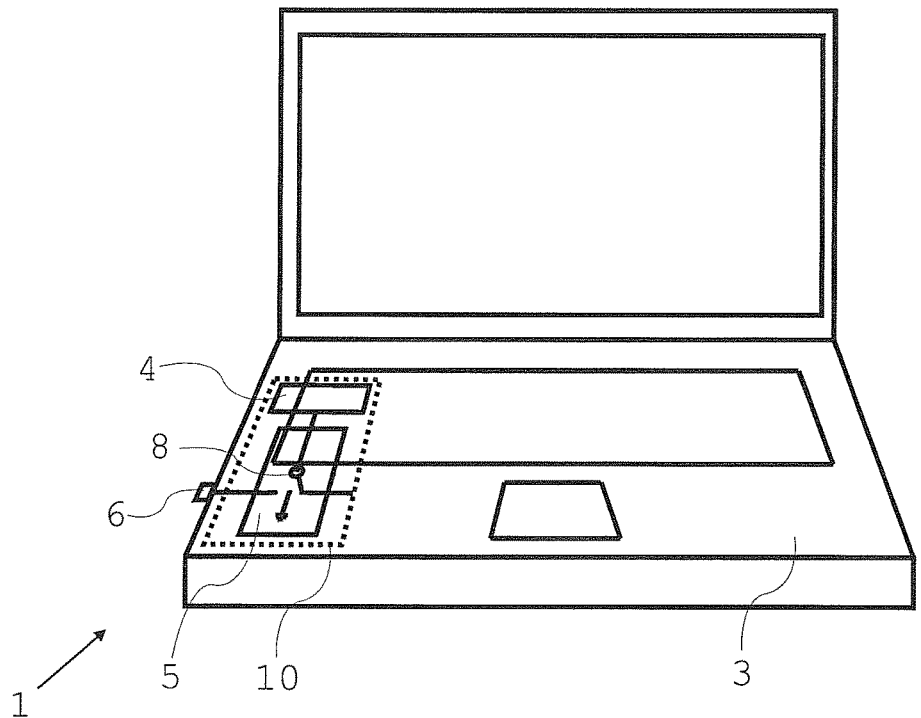
FIG. 4 shows a data loading device comprising an internal interface with the computer.

FIG. 4 shows another advantageous embodiment of a data loading device 1, the switching device 5 and the data storage device 4 being integrated on an interface card 10 that is preferably replaceable and is internally connected to the computer 3. The data connection 6 for connecting the data loading device 1 to an aircraft system 2 is provided at an output of the interface card 10. This embodiment allows the data loading device 1 to be handled in a simple manner. In an alternative embodiment, the data storage device 4 may also be externally connected to the interface card 10.

EMBODIMENT 1

Data loading device (1) for loading software into aircraft systems (2), the data loading device (1) comprising a portable computer (3) and a data storage device (4), characterised in that
the data loading device (1) comprises a switching device (5),
the switching device (5) comprising an external data connection (6),
the switching device (5) is adapted to switch connections (7, 17, 27) between the computer (3), the data storage device (4) and the data connection (6),
the switching device (5) having a first switching state which comprises a connection (7, 27) between the computer (3) and the data storage device (4),
the switching device (5) having a second switching state which comprises a connection (17, 27) between the data storage device (4) and the data connection (6).

EMBODIMENT 2

Data loading device (1) according to embodiment 1, characterised in that the switching device (5) does not have a switching state which comprises a connection (7, 17) between the computer (3) and the data connection (6).

EMBODIMENT 3

Data loading device (1) according to either embodiment 1 or embodiment 2, characterised in that the switching device (5) comprises an electronically controlled switch (8).

EMBODIMENT 4

Data loading device (1) according to any of the preceding embodiments, characterised in that if a power supply to the computer (3) and/or to the switching device (5) is interrupted, the switching device (5) is configured to automatically switch into the first switching state.

EMBODIMENT 5

Data loading device (1) according to any of the preceding embodiments, characterised in that the data storage device (4) comprises a Universal Serial Bus (USB) standard interface.

EMBODIMENT 6

Data loading device (1) according to any of the preceding embodiments, characterised in that the switching device (5) is arranged on an interface card (10).

EMBODIMENT 7

Data loading device (1) according to any of the preceding embodiments, characterised in that the computer (3), data storage device (4) and switching device (5) are arranged together in one housing (9).

EMBODIMENT 8

Data loading device (1) according to any of embodiments 1 to 6, characterised in that the switching device (5) can be connected to the computer (3) by means of an external interface.

EMBODIMENT 9

Data loading method comprising a data loading device (1) according to any of claims 1 to 8, characterised by the following method steps:
providing the software on the computer (3),
copying the software from the computer (3) into the data storage device (4), the switching device (5) being in the first switching state,
switching the switching device (5) into the second switching state,
connecting the data connection (6) to an aircraft system (2).

EMBODIMENT 10

Data loading method according to embodiment 9, characterised by the following method steps, which are carried out after the data connection (6) is connected to an aircraft system (2):
disconnecting the data connection (6) from the aircraft system (2),
switching the switching device (5) into the first switching state,
reading out the data storage device (4) using the computer (3),
erasing the software from the data storage device (4).

EMBODIMENT 11

Data loading method according to embodiment 10, characterised in that the software is provided on the computer (3) in an encrypted manner.

The invention claimed is:

1. A data loading device to load software into aircraft systems, comprising:
   a portable computer;
   a data storage device; and
   a switching device,
   wherein the switching device comprises:
     an external data connector,
   wherein the switching device is connected to the portable computer,
   wherein the switching device is connected to the data storage device,
   wherein the switching device is configured to switch connections between the portable computer, the data storage device, and the external data connector, so as to switch between a first switching state of the switching device and a second switching state of the switching device,
   wherein in the first switching state of the switching device the portable computer is connected to the data storage device and the data storage device is not connected to the external data connector,
   wherein in the second switching state the data storage device is connected to the external data connector and the portable computer is not connected to the data storage device, and
   wherein the switching device is configured such that the switching device does not switch to a switching state of the switching device where the portable computer is connected to the external data connector.

2. The data loading device according to claim 1,
   wherein in the first switching state of the switching device the portable computer is not connected to the external data connector, and
   wherein in the second switching state of the switching device the portable computer is not connected to the external data connector.

3. The data loading device according to claim 1,
   wherein the switching device comprises an electronically controlled switch, and
   wherein the electronically controlled switch switches connections between the portable computer, the data storage device, and the external data connector, so as to switch between the first switching state of the switching device and the second switching state of the switching device.

4. The data loading device according to claim 2,
   wherein the switching device comprises an electronically controlled switch, and
   wherein the electronically controlled switch switches connections between the portable computer, the data storage device, and the external data connector, so as to switch between the first switching state of the switching device and the second switching state of the switching device.

5. A data loading device to load software into aircraft systems, comprising:
   a portable computer;
   a data storage device; and
   a switching device,
   wherein the switching device comprises:
     an external data connector,
   wherein the switching device is connected to the portable computer,
   wherein the switching device is connected to the data storage device,
   wherein the switching device is configured to switch connections between the portable computer, the data storage device, and the external data connector, so as to switch between a first switching state of the switching device and a second switching state of the switching device,
   wherein in the first switching state of the switching device the portable computer is connected to the data storage device and the data storage device is not connected to the external data connector,
   wherein in the second switching state the data storage device is connected to the external data connector and the portable computer is not connected to the data storage device, and
   wherein the switching device is configured such that, when the switching device is not in the first switching state of the switching device, if a portable computer power supply to the portable computer is interrupted, or a switching device power supply to the switching device is interrupted, the switching device automatically switches into the first switching state of the switching device.

6. The data loading device according to claim 1,
   wherein the switching device is arranged on an interface card.

7. The data loading device according to claim 1,
   wherein the portable computer, the data storage device, and the switching device are arranged together in a housing.

8. The data loading device according to claim 1,
   wherein the switching device is connected to the portable computer via an external interface.

9. The data loading device according to claim 4,
   wherein the switching device is configured such that, when the switching device is not in the first switching state of the switching device, if a portable computer power supply to the portable computer is interrupted, or a switching device power supply to the switching device is interrupted, the switching device automatically switches into the first switching state of the switching device.

10. The data loading device according to claim 4,
    wherein the switching device is arranged on an interface card.

11. The data loading device according to claim 4,
    wherein the portable computer, the data storage device, and the switching device are arranged together in a housing.

12. A method of data loading, comprising:
    providing a data loading device,
    wherein the data loading device comprises:
      a portable computer;
      a data storage device; and
      a switching device,
      wherein the switching device comprises:
        an external data connector,
      wherein the switching device is connected to the portable computer,
      wherein the switching device is connected to the data storage device,
      wherein the switching device is configured to switch connections between the portable computer, the data storage device, and the external data connector, so as to switch between a first switching state of the switching device and a second switching state of the switching device, wherein in the first switching state of the switching device the portable computer is connected to the data storage device and the data storage device is not connected to the external data connector, wherein in the second switching state of the switching device the data storage device is connected to the external data connector and the portable computer is not connected to the data storage device, and wherein the switching device is configured such that the switching device does not switch to a switching state of the switching device where the portable computer is connected to the external data connector;

providing software on the portable computer;

copying the software from the portable computer to the data storage device, with the switching device in the first switching state of the switching device;

switching the switching device to the second switching state of the switching device; and connecting the external data connector to an aircraft system.

13. The method according to claim 12, wherein after connecting the external data connection to the aircraft system, further comprising:

disconnecting the external data connection from the aircraft system;

switching the switching device to the first switching state of the switching device;

reading out the data storage device using the portable computer; and erasing the software from the data storage device.

14. The method according to claim 13, wherein providing the software on the portable computer comprises providing the software on the portable computer in an encrypted manner.

15. The method according to claim 13, wherein in the first switching state of the switching device the portable computer is not connected to the external data connector, and wherein in the second switching state of the switching device the portable computer is not connected to the external data connector.

16. The method according to claim 15, wherein the switching device is arranged on an interface card.

17. The method according to claim 15, wherein the portable computer, the data storage device, and the switching device are arranged together in a housing.

18. The method according to claim 12, wherein the switching device is configured such that, when the switching device is not in the first switching state of the switching device, if a portable computer power supply to the portable computer is interrupted, or a switching device power supply to the switching device is interrupted, the switching device automatically switches into the first switching state of the switching device.

19. The data loading device according to claim 5, wherein in the first switching state of the switching device the portable computer is not connected to the external data connector, and wherein in the second switching state of the switching device the portable computer is not connected to the external data connector.

20. The data loading device according to claim 5, wherein the switching device comprises an electronically controlled switch, and wherein the electronically controlled switch switches connections between the portable computer, the data storage device, and the external data connector, so as to switch between the first switching state of the switching device and the second switching state of the switching device.

* * * * *